(12) United States Patent
Ditzik (10) Patent No.: US 7,509,142 B2
(45) Date of Patent: Mar. 24, 2009

(54) NOTEBOOK COMPUTER WITH REPLACEABLE BATTERY UNIT

(76) Inventor: Richard Joseph Ditzik, 307 Surrey Dr., Bonita, CA (US) 91902

( * ) Notice: Subject to any disclaimer, the term of this patent is extended or adjusted under 35 U.S.C. 154(b) by 0 days.

(21) Appl. No.: 11/285,430

(22) Filed: Nov. 22, 2005

(65) Prior Publication Data

US 2006/0079277 A1 Apr. 13, 2006

Related U.S. Application Data

(62) Division of application No. 09/391,966, filed on Sep. 8, 1999, which is a division of application No. 08/832,923, filed on Apr. 4, 1997, now Pat. No. 5,983,073.

(51) Int. Cl.
*H04M 1/00* (2006.01)

(52) U.S. Cl. .................... 455/557; 455/556.1

(58) Field of Classification Search ............. 455/556.1, 455/557, 572, 90.3; 345/168, 169, 901, 905; 364/708.1; 361/380, 391, 392, 393, 395, 361/680, 683, 394; 429/97
See application file for complete search history.

(56) References Cited

U.S. PATENT DOCUMENTS

| | | | | |
|---|---|---|---|---|
| 4,096,577 A | * | 6/1978 | Ferber et al. ................ | 708/190 |
| 4,903,222 A | | 2/1990 | Carter et al. | |
| 5,132,876 A | * | 7/1992 | Ma ............................ | 361/680 |
| 5,200,913 A | | 4/1993 | Hawkins et al. | |
| 5,225,293 A | | 7/1993 | Mitchell et al. | |
| 5,400,055 A | * | 3/1995 | Ma et al. .................... | 345/168 |
| 5,594,617 A | | 1/1997 | Foster et al. | |
| 5,596,482 A | | 1/1997 | Horikoshi | |
| 5,677,827 A | * | 10/1997 | Yoshioka et al. ............ | 361/683 |
| 5,716,730 A | * | 2/1998 | Deguchi ...................... | 429/97 |
| 2002/0030969 A1 | * | 3/2002 | Foster et al. ................ | 361/683 |

* cited by examiner

*Primary Examiner*—Sam Bhattacharya (57) ABSTRACT

A small light weight modular microcomputer based computer and communications systems, designed for both portability and desktop uses. The systems make use of a relative large flat panel display device assembly (2), an expandable hinge device (10), battery power source (9), keyboard assembly (16), and wireless communications devices (32, 51). The systems are capable of bi-directional realtime communications of voice, audio, text, graphics and video data. Both wire-based or wireless communications methods and devices are implemented. Wireless communications devices may include one or more telephone-like handsets (14) and/or earset (34). The wireless communication devices may include one or more antennae (32). Systems can be configured in a portable arrangement similar to conventional personal computers, but can be quickly and easily disassembled and re-assembled for office desktop uses. Systems may consist of a base computer unit (100) comprising wireless communication devices may act as a relay station relaying voice and other data between the handset or earset and external wide area communications networks. The system may be capable of performing, personal digital assistant (PDA), cellular telephone, conventional notebook computer, desktop computer functions.

8 Claims, 9 Drawing Sheets

NOTEBOOK COMPUTER WITH REPLACEABLE BATTERY UNIT

RELATED APPLICATION

The present application is divisional application of U.S. patent application Ser. No. 09/391,966, filed Sep. 8, 1999 which was a divisional application of U.S. patent application Ser. No. 08/832,923 filed Apr. 4, 1997 that issued as U.S. Pat. No. 5,983,073. Each of the related applications is incorporated by reference in its entirety.

BACKGROUND OF THE INVENTION

1. Field of the Invention

This invention relates to portable personal computer systems with external communication means, which can be used by an individual in both desktop and mobile environments. The computer system involves a relatively large color flat panel display, conventional microcomputer system, and a plurality of human interface means. In particular, it relates to a computer unit, having a light weight thin notebook-like computer structure that is capable of performing personal digital assistants (PDA) like functions and wireless external communications of voice, text, graphic and image data.

2. Description of Prior Art

There are several shortcomings with prior art notebook computers, PDAs and wireless telephone units. Notebook computers have a relatively large flat panel display device, a full alphanumeric keyboard and battery power. PDAs are small handheld units with a small LCD display, small key pad and touch pen. PDAs are designed to be placed in one's pocket or purse for maximum portability. A problem arises when customers desire large high resolution color display for both portable and desktop applications. To use a computer system for both portable and desktop uses, the customer must purchase multiple systems. The cost of color flat panels are still too expensive for most customers to by two display monitors, one display for desktop and one for the portable applications. Many customers require functionality of a desktop computer, notebook computer and PDA, but it is much too expensive to purchase multiple CPUs, displays, and keyboards.

U.S. Pat. No. 5,189,632 of Paajanen et al disclosed a hand held computer unit with an antenna and wireless RF communication capability, small flat panel display and a keyboard, in a partial clam shell type structure. However, they do not teach expandable hinge means, base station for handset relay functions, or cover latching function. U.S. Pat. No. 5,327,486 of Wolff et al teach a conventional laptop computer with antenna and RF communications to a radio network and local exchange telephone network. However, they fail to teach expandable hinge means, edge hinge means, handset means or base station relay functions. U.S. Pat. No. 5,459,458 of Richardson et al teach a virtual pager and data terminal system. However, they do not teach notebook like computers, base unit station or personal/PDA computing. U.S. Pat. No. 5,008,927 of Weiss et al teach a computer and telephone system with a display screen on a conventional telephone structure keyboard unit. However they fail to teach notebook like structure, wireless communication or handset relay functions. U.S. Pat. No. 5,196,993 of Herron et al teach a laptop computer with a removable flat panel display with built-in support feet for desktop support. However, they fail to teach expandable hinge means, exterior communications functions, cover latching functions or computer display assembly. U.S. Pat. No. 5,200,913 of Hawkins et al teach a laptop computer with flat panel display and pen input means. However, they fail to teach expandable hinge means, edge mounted hinge or latching functions.

Wireless hand held computer devices, such as cellular and Personal Communication System (PCS) telephones, have limited display capabilities. Piror art wireless computer units have display screens that are small (1.5-2.5" diameter), and they lack interactive capabilities to be successful for text, graphic and video applications. Some prior art notebook and laptop computers have integrated wireless communication means, but they are too large and bulky to be successful for in mobile uses. Prior art wireless devices do a poor job of providing voice, data and video communication functions. Typical wireless computer systems have display screens that are too small and have limited computing power. Prior art laptop and notebook computers are too heavy to carry for long periods. Inventions herein solve these problems by embodying a unique relatively thin notebook-like computer system that is capable of: being: (1) opened like a notebook, (2) quickly disassembled and re-assembled, (3) used for handset/earset communications relay operations and (4) used in a wide variety of computing, collaboration, communications and conferencing applications.

Inventions described herein are based on several Disclosure Documents submitted to the U.S. Patent and Trademark Office, including Document Nos. 353691, 363753, 368165, and 377365. Inventions herein solve several prior art shortcomings, resulting in new modular integrated computer systems. The inventions as described below can be quickly configured to desktop, notebook, wireless and/or PDA embodiments. Thus, the user will be able to purchase a single computer system and pay much less money than conventional systems.

SUMMARY OF THE INVENTION

An object of this invention is to provide a modular multiple function display-computer system, where one can use the same relatively high resolution color flat panel display in both a desktop and mobile environments.

Another object of this invention is to provide means to reduce the cost to the customer of owning several expensive computer systems, by combining in one system the capability of performing both office desktop and portable/mobile computing and communications applications. Thus the invention herein saves the user the expense of purchasing separate computer systems for desktop uses, notebook computer uses, PCS uses and PDA uses.

Still another object of this invention involves means to quickly configure a modular notebook or PDA-like computer system into a plurality of system configurations for personal computer and wide area communication operations.

Another object of this invention is to provide for a relatively thin and light weight computer unit to be carried under one's arm in a notebook-like fashion, yet have sufficient computing power to execute a wide range of conventional computer and communications applications.

Still another object of this invention is to provide for bi-directional communication of voice, audio, text, graphics, image and/or video data to wide area communications networks where one or more users may communicate with other users with appropriate apparatus. The communication may realtime or store forward type communications.

Another object of this invention involves hardware and program software to control cellular or PCS communications, combined with a light weight mobile notebook or PDA like unit. The unit or system would act as a computing platform and base communications relay station. The system or unit may then relay voice and data to/from a handset unit or earset unit, where the base unit relays the this voice and data information to/from a wide area communication network.

Still another object of this invention involves means for quick disconnection or disassembly and subsequent connection or assembly of key component of the system, such as battery power unit, communication adapters (modems) and/or wireless telephone units.

A still further object of this invention is to use the same display-computer system assembly, comprising of relatively large high resolution color flat display panel and a powerful CPU with large memory, etc., and combining them in a modular fashion with a thin keyboard, battery power source, modem, and wireless communications means.

Another objective of this invention is to provide means for integrated telephony functions on a portable computing platform, with powerful microprocessors running Windows operating systems for a wide range of computing and communication functions.

A still further objective of this invention is to provide for full Internet access on a wireless mobile platform, where the user can access the world wide web and execute most of the available Internet browser functions and plug-ins. The computer system would be capable of performing most of the Internet data access, download, upload and conferencing functions

DETAILED DESCRIPTION

Figure 1:
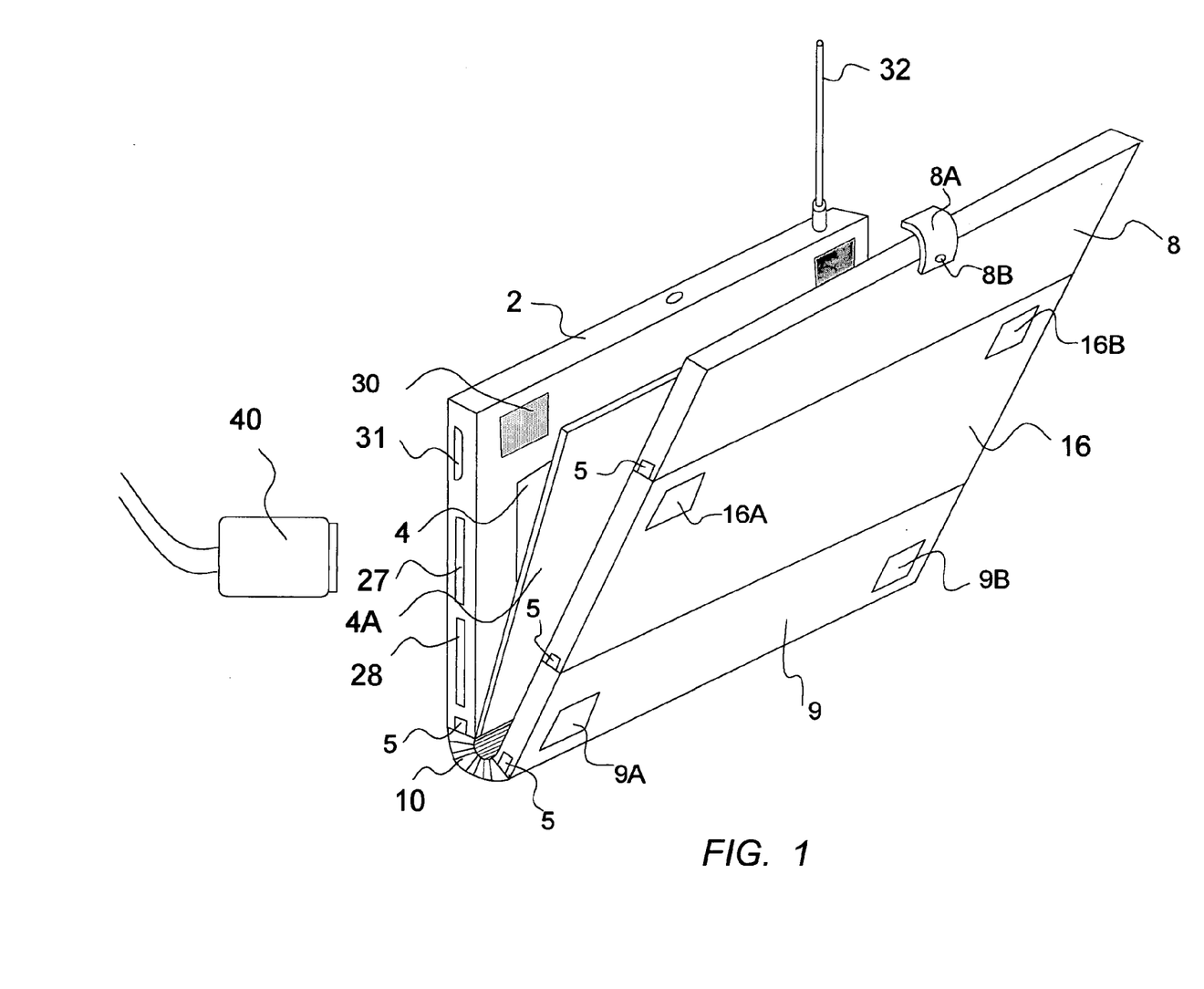
FIG. 1 shows a perspective view of a portable computer with a notebook clamshell-like structure.

FIG. 1 shows a computer system, to be operated by a person or user, where the unit has a conventional notebook clamshell-like structure. The computer system as used herein can also be referred to as a portable computer system, computer-display unit or base unit, and shall also include the terms: personal computer, notebook computer, sub-notebook computer or Personal Digital Assistant (PDA). The computer system as disclosed herein typically comprises of a flat panel display assembly 2, which includes a display panel and screen 4 and other components described below. An expandable hinge means 10 connects the flat panel display assembly and cover assembly (8, 9 and 16). Expandable hinge means 10 may be embodied many ways including using flexible material that is corrugated, having its groves running parallel to the edge of the notebook structure. Cover assembly may consist of two or more sections, such as a first cover section 8, second cover section 9, and a keyboard section 16. One or more of the cover sections may be quickly disassembled from each other by the user. To avoid accidental disassembly, means may be embodied where the user must simultaneously press two push buttons 5, for example one on each side of the structure, in order to disconnect the sections. The portable computer system may also have an inside protective sheet member 4A attached to the inside the fold of the computer system. FIG. 1 shows a partially open notebook-like structure, but it may be closed all the way shut and secured, by a securing strap means 8A. This strap means may be secured to the other side of the display assembly 2 by Velcro like strips, for temporary securing and un-securing, with one's fingers. One purpose of this foldable embodiment is to provide the computer user with a handy portable notebook computer that: (1) when closed, one can easily carry, cradled in one hand under one's arm, and (2) easily opened for access to the computer indicators and controls.

The flat panel display assembly 2 may be a monochrome or color liquid crystal displays (LCD), such as those manufactured by Sharp Electronics, NEC Electronics, Toshiba Corporation or others. The display panels screen sizes may be 10 to 14 inches or more in diameter. The display pixel arrays may be 640 by 480 (VGA), 800 by 600 (SVGA), or 1024 by 768 (XGA). Color depth should be six bits, and the response time should be 45 to 50 milliseconds ($t_{on}+t_{off}$). Brightness of the screen should 70 Cd/m$^2$ and contrast ratio be at least 100:1, where 250:1 is be preferred.

LCD panels from Sharp Electronics may be used in the embodiments. Applicable LCD Models include LQ11DS01, LQ12DS01, LQ12DX01 and LQ12X12. These panels have screen sizes of either 11.3 or 12.1 inches measure along their diagonal. Each panel is capable of a color depth of 6 bits/sub-pixel, a response time of 80 ms, brightness of 70-150 cd/m$^2$ and a contrast ratio of 100:1. LCD panels from NEC may also be used, such as NL10276BC24-04, NL8060BC31-02, NL8060BC31-01, and NL8060BC29-01. These panels are capable of 6 bit color depth, 50 ms response time, 70 cd/m$^2$ brightness and 150:1 contrast. Toshiba panels that may embodied include: LTM11C016, LTM12C236, or LTM12C25S, which are capable of 50 ms response, 70 cd/m$^2$ brightness and 100:1 contrast. Manufactures' references and manuals for each are hereby incorporated by reference.

Several I/O slots and/or connectors may be embodied at one or more edges of the flat panel display assembly 2. FIG. 1 shows access slots to a floppy disk 28, external communication means 27, printer connector 31. Other external connection means may be embodied. Several connector means may be embodied, including auxiliary video connector, COM ports, and/or mouse/game ports. PCMCIA PC card 40 may be included for adding fax/modem, network interface (wire or wireless) external communications and/or added memory. An integrated built-in transmitter receiver and a retractable antenna 32 may be embodied, for example to the flat panel display assembly 2. The antenna and associated RF transceiver may be used for wireless communications to/from an external communication network. Many of the well-known notebook computer or personal computer I/O devices may be embodied.

An important feature of this embodiment is the dimensions of the computer-display unit. It may be made conveniently larger than a 8.5×11 inch sheet of paper, so that one can place one or more sheets of paper (or other relatively thin flat objects) inside the closed clamshell like notebook structure in a folding or latching fashion. The user can safely carry papers from location to location without folding or wrinkling them. Thus the unit can act as a carrying device as well as a notebook computer. The outside surfaces and edges of notebook computer may be covered with leather, vinyl of other type of soft material, for easy of hand carrying and surface protection. Other parts may be embodied including foldable short legs 9A and 9B, keyboard resting pads 16A and 16B, built-in audio speaker(s) 30.

Figure 2:
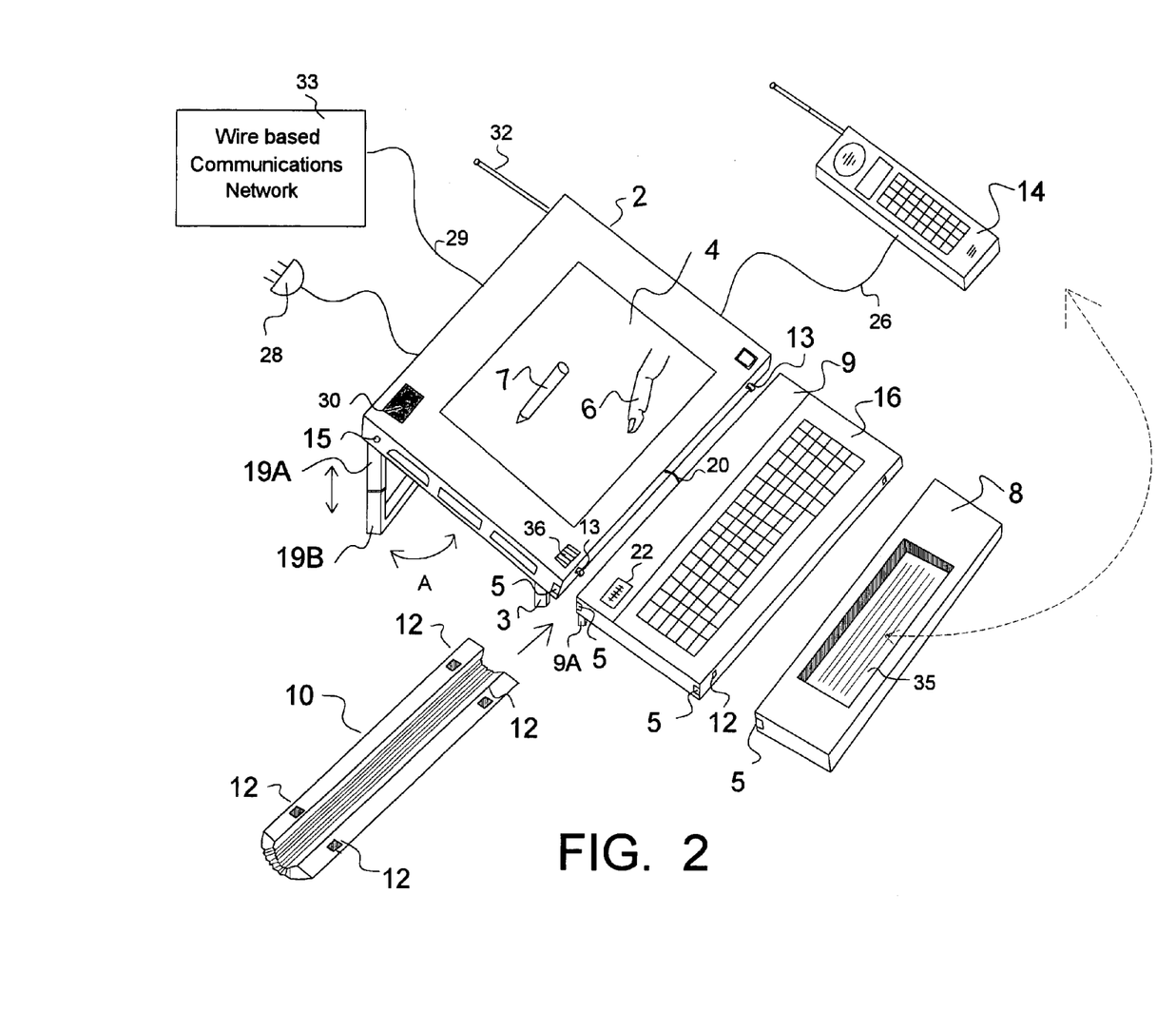
FIG. 2 shows a perspective view of a modular portable computer system in desktop configuration.

FIG. 2 shows the portable computer with several parts detached or disassembled. This embodiment may be used in desktop computer system environments. The flat panel display assembly 2 may be placed at an inclined angle, with foldable leg support means 19A and 19B. The leg support means may fold relatively flush to the backside of the assembly 2 (motion range A) when not in use, via a simple hinge 15. Vertical portions 19A and 19B may slide in and out, in a telescoping type arrangement, to allow wide range inclination angles. A pair of short legs 3 may be placed near the front of assembly 2 that may also fold relatively flush with the back of the assembly. Means may be included to place the screen at a vertical orientation. A pen or stylus input means may be associated with the display screen 4. The pen or stylus means may include finger input (touch panel) means, where one can write or point to area on the display screen. The expandable hinge means 10 may be removed from the assembly 2 and from the cover section 9 by a quick disconnect or disassembly means 5. Alternatively, the hinge means may be fixed to parts 2 and 9. The hinge means may be made of a relatively flexible material, such as leather and vinyl. It may be corrugated as shown in the figure so it can bend easily and expand, as required. The hinge may have a number of attachment slots 12 for the quick dis-attachment or disconnection from hook mechanisms 13. FIG. 2 shows the flexible hinge means 10 removed from the other assemblies.

Cover section 9 may contain a battery power unit containing one or more batteries and power circuit elements. The battery power unit may be embodied with several types of batteries, including Lithium-ion or NiCd batteries. The power unit may be a self contained battery package, having an easy to read charge indicator 22 that indicates the state of the battery's electrical charge. Because all batteries have a limited useful charge life, the package may be easily and quickly disconnected from the keyboard section 16 and replaced with another battery package. Spare battery packages and other spare parts could be carried in a separate traveling case (not shown). The keyboard section 16 may have a full size QWERTY keyboard with movable tactile keys. An electrical cable 20 may connect the keyboard to the computer-display assembly 2. Although short cable is shown, it may be a long cable or a flexible cable, so that the keyboard may be moved about if desired. Alternatively, a wireless electromagnetic link may be embodied such as infrared (IR) or RF links, which would replace electrical cables 20 and 26. The cover section 8 may contain a wireless handset 14, such as a cellular telephone transceiver. The handset may have retractable antenna, small speaker, keypad, built-in microphone and a battery source. This handset 14 may be capable of analog or digital cellular operation, including AMPS, TDMA, CDMA, PCS, CDPD, or equivalent types for communicating with wide area wireless communication networks. The wireless unit 14 can be easily removed from a cutout or recess area 35 in the cover section 8. The recess area is made slightly larger than the outside dimensions of the handset 14, so it can fit inside the recess with a relatively snug fit. It is important the handset be easily and quickly removed and replaced in the base unit. Alternatively, cover section 8 consist of the handset itself, so that a separate cover section with recess would not be required.

The portable computer system's flexible hinge and the cover sections should be made relatively thin so that when the two halves are folded (rotated) closed, it will not be too thick or heavy to carry with one hand. As shown in FIG. 1, legs 3, 5, 19A and 19B may be folded roughly flush with outside surfaces of the unit. The number cover sections are not limited to three. The cellular handset is shown in FIG. 2 may be connected to the computer system by an optional electrical cable 26. A RF transceiver in the wireless telephone would serve as the transceiver for the computer as well. This embodiment might be desirable to reduce the overall cost of the system. However, a wireless RF transceiver and modem may be located in the flat display panel assembly 2 for voice or data communications. An antenna may be embodied on the display assembly 2, with a retractable antenna 32. The display assembly may include the computer system located within the assembly housing. The advantage of this later embodiment is that the telephone 14 and computer system could be operated independently.

The portable computer system may also have means for connection to a non-battery power source, as shown in FIG. 2, via a standard power line cord and plug 28. The system may also have means for connection to an external wire based wide area communications network 33, via cable 29. The wire based wide area network may include one or more telephone networks, cable TV networks and/or computer LAN/WANs. Telephone networks may include POTS, ISDN, ATM or other equivalent types. Several computer interface connection means may be embodied, for example interface slots/connectors as shown (27, 31, and 38). These interfaces might include R/S 232, USB, IEEE 1394, PCMCIA, or other computer I/O (serial or parallel) connections. Useful connections may include a bus extender connection, so that the notebook computer can be interfaced to another more powerful computer. For portability reasons, it is desirable that the modem or digital terminal adapter be built into the computer system unit. Some means for software loading should be included such as a floppy disk or smart card. Internal mass memory of the computer system could include ROM, flash memory, or other memory means. Means for accepting PCMCIA cards, ROM cards or other types of memory card may be implemented. Preferably, the system may be embodied with a very small light weight and low power mini hard disk. One or more IR communications interfaces may also be implemented.

Other capabilities such as FAX send/receive, speech recognition, voice processing voice mail, telephony, and E-mail functions may be implemented in the computer system. A built-in microphone 36 and speaker 30 may be embodied to support speech input/output and multimedia functions. Preferably the display should be capable of full color with a wide viewing angle. If the display is back lit, the user should be allowed to switch the backlight "on", "off" and to a multiplicity of levels in between. The operating system of the notebook/PDA should be a GUI type such as Windows™ 3.1/95, Windows CE™, MagicCap or another suitable GUI based computer operating system. The system should can be designed to support wide range of communication connectivity and software compatibility.

Figure 3:
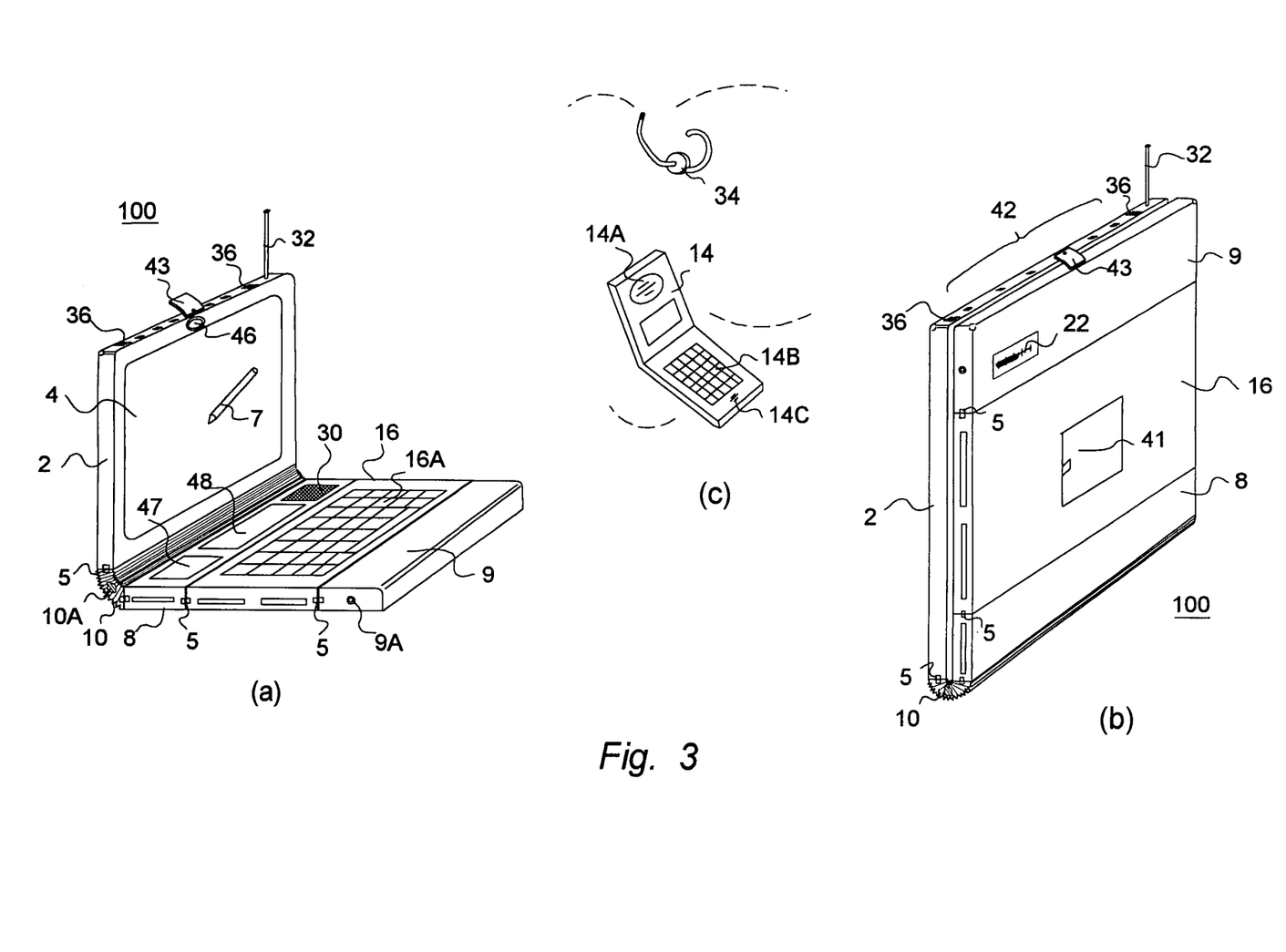
FIG. 3(a) shows a notebook like portable computer in an open state.
FIG. 3(b) shows the notebook like computer in a closed state.
FIG. 3(c) shows a handset telephone unit and earset unit.

FIGS. 3a and 3a show another embodiment of the invention having a base unit or notebook computer system 100, a handset unit 14 and a earset 34. This embodiment shows a relatively thin flat display panel assembly 2 having a display screen 4. The system may also include a pen and/or finger input means 7. The base unit has an expandable hinge means 10 physically connecting the display assembly to the other half of the base computer unit. The other half can be comprised of several sub-assemblies including a battery power source section 9, keyboard assembly 16 and an electronics housing section 8. The keyboard assembly contains a keyboard unit 16A, which may contain a full-size QWERTY keyboard unit. The housing section 8 may include a wireless modem or communications adapter means. The expandable hinge means 10 should have an easy access locking and unlocking means 10A, which can temporarily lock the rotation of the two halves at the user's desired angle. Electronic housing section 8 may be attached edge wise to the keyboard assembly 16 by a quick attach and release connection means. As shown in the figures, several assemblies can be disassembled by pressing one or more finger access tabs 5. Likewise, a battery source section 9 may be edgewise connected to the opposite edge of the keyboard, via similar quick attach and release connection mechanism having finger push tabs 5. The tabs may be located on each side of the assemblies for quick and easy, but safe, user disassembly. The connection means may include means for secure physical attachment and connection of electrical wires, located inside the subassemblies. Although the sections may be rigid, the attachment mechanisms may be may somewhat flexible, elastic or pliable, so that the combination of assemblies can bend slightly.

Battery power source unit 9 may consist of one or more batteries with voltage regulation, AC/DC operation, power management circuits and charging circuitry. In a preferred embodiment the unit should be capable of accepting electrical charge from an AC line. A important feature embodiment of the invention is means for quickly interchanging an electrical power depleted battery power unit 9 with a freshly charged battery unit. This may be accomplish by a combination of finger push tabs 5, latches and hook means for quick disconnection and re-attachment. In one intended scenario a user may carry several spare battery packages in a separate briefcase. When the attached battery package is depleted, the user can quickly changed out the battery sections. The user can then plug the depleted battery package into an AC line for a built-in charging operation.

It is preferable that each of the major assemblies and sub-assemblies be made relatively thin for easy carrying. The expandable hinge means should be made somewhat flexible, elastic or pliable so that the user may place relatively thin flat objects inside the folded space of the notebook-like unit. These thin objects may include sheets of paper, cards, brochures, or similar relatively then flat items. Linkages between the sections may be made somewhat yielding, pliable, elastic and/or stretchable. Although the display device may be ridged, the other half of the notebook may be embodied with thin flexible enclosures and other structural components. Also, the flat panel display device and assembly 2, 4 may be made flexible. Thin and flexible keyboards are known to those in the art. The other parts may be adapted to have thin and slightly flexible mechanical features. The two halves can be closed by hand and secured by a flap and snap means 43 or equivalent means. As discussed above, the expandable hinge means 10 may be made flexible and expandable by incorporating a multiplicity of small folds or other equivalent means. If the user places thin objects between the halves of the base unit, one or more sides could bulge out slightly, improving the physical object carrying capability of the notebook computer. This object carrying capability is an important feature for mobile users who may be carrying the notebook almost everywhere they go. The user may securely place and latch paper sheets, letters, memos, or other flat objects inside the notebook clam shell structure. A base unit hinge locking and unlocking means 10A may also be embodied, so that the user can quickly and easily temporarily lock the two halves of the unit to a rotationally fixed state (and later un-lock them).

FIG. 3(a) also shows several other elements including a small CCD video camera 46, built into the display assembly for video conferencing and other uses. One or more built-in audio microphones 36 may be embodied in the base unit. Preferably one microphone should be located on the edge of the notebook, as shown, so that the user may be in voice communications with other while the unit is closed. One or more audio speakers 30 may be built into the base unit. One or more compartments 47 and 48 may be embodied at convenient locations to store attachments for use with the mobile computer system. A telescoping antenna 32 may be embodied into the base unit as shown, or it may be built-in the unit and not exposed. Although the base unit 100 can be a self-contained unit, it may work with other optional attachments, such as a wireless cellular-like handset 14 or earset 34 as shown in FIG. 3(c). The handset 14 may operate roughly equivalent to conventional cellular telephone handsets with a built in power source, providing voice and/or data communications to wide area communications networks. The earset 34 has a small low power RF transceiver, audio microphone, audio speaker and small battery source, which is capable of fitting into the user's ear. The wireless earset unit may be used for hands free applications. The user may then walk around while communicating with the handset or earset. If one is using the earset he/she may also use a pen input means 7 or keyboard 16 while in audio communications. For semi-private voice communications, some users may prefer using the handset 14, with hand set speaker 14A, handset key pad 14B and handset microphone pickup 14C.

If one is using the handset or earset, the base computer unit 100 may be placed some distance away from the user, typically in the same room or nearby room. The base computer unit may be designed for a higher transmitting power level. The base unit may be designed to allow the user to switch between a high or low level transmitting and receiving power levels. The earset 34 or handset 14 can be designed for a much lower RF transmit and receiver electrical power levels, because the base computer unit 100 can be place a relatively short distance away (typically from a few feet to about fifty feet). Thus, the base unit 100 may relay RF communications between the handset or earset and an external wide area communications network. The base unit could safely embody a more powerful RF transmitter resulting in a larger signal to noise ratio. This will result in improved wireless communication to and from wide area networks that may have antennas several miles away. A very important advantage of this invention is that the user has the option of having very low electrical power electromagnetic fields near his/her's head, thus improving the health and safety aspects for the user. Since less power is required for the handset 14, it can be thinner and smaller then a standard cellular handset. Thus the handset can be smaller and easier to place in the user's pocket. The earset can be made vary small so that the users can leave it in his/her's ear for long periods of time and have one's hands free for other uses.

FIG. 3(b) shows the base unit computer-display unit 100 in a closed configuration, in which one may carry it under one's arm. Since the unit is typically battery powered and contains electronics for a wireless voice and PCS like operations, one could use it for voice/data communications while carrying it about (i.e., in transport). The user may speak towards one or more microphones 36 located along the top edge. The user will be able to hear the other person(s) talking, through audio speakers 30 located conveniently on the base unit. A small telephone keypad could be located behind a protective door 41, for convenient dialing of a telephone number. The door may be a simple sliding door device or mechanism. The antenna 32 may be a sliding telescoping type. A simple display indicator 22 may show the electrical charge state of the battery source. A plurality of switches and indicators 46 may be located along one edge of the base unit for easy viewing and access. Such switches and indicators may include: an On-Off switch, Mode Switch (for voice, data, and video modes, etc.), high/low power transmit switch, ring/alarm mode and/or speaker/mic mode (for earset, handset, etc.). For securing the two halves of the base unit, a flap 43 made of a simple expanding material, which may include a snap means at one end and may be secured with a pin and/or pivot means. The flap would then snap to secure the flat panel display assembly 2 and cover assembly (9, 16, 8). In FIG. 3(a), the flap 43 is shown rotated in the opposite orientation for clarity only. Other securing means may be embodied that are know to those in the art.

Figure 4:
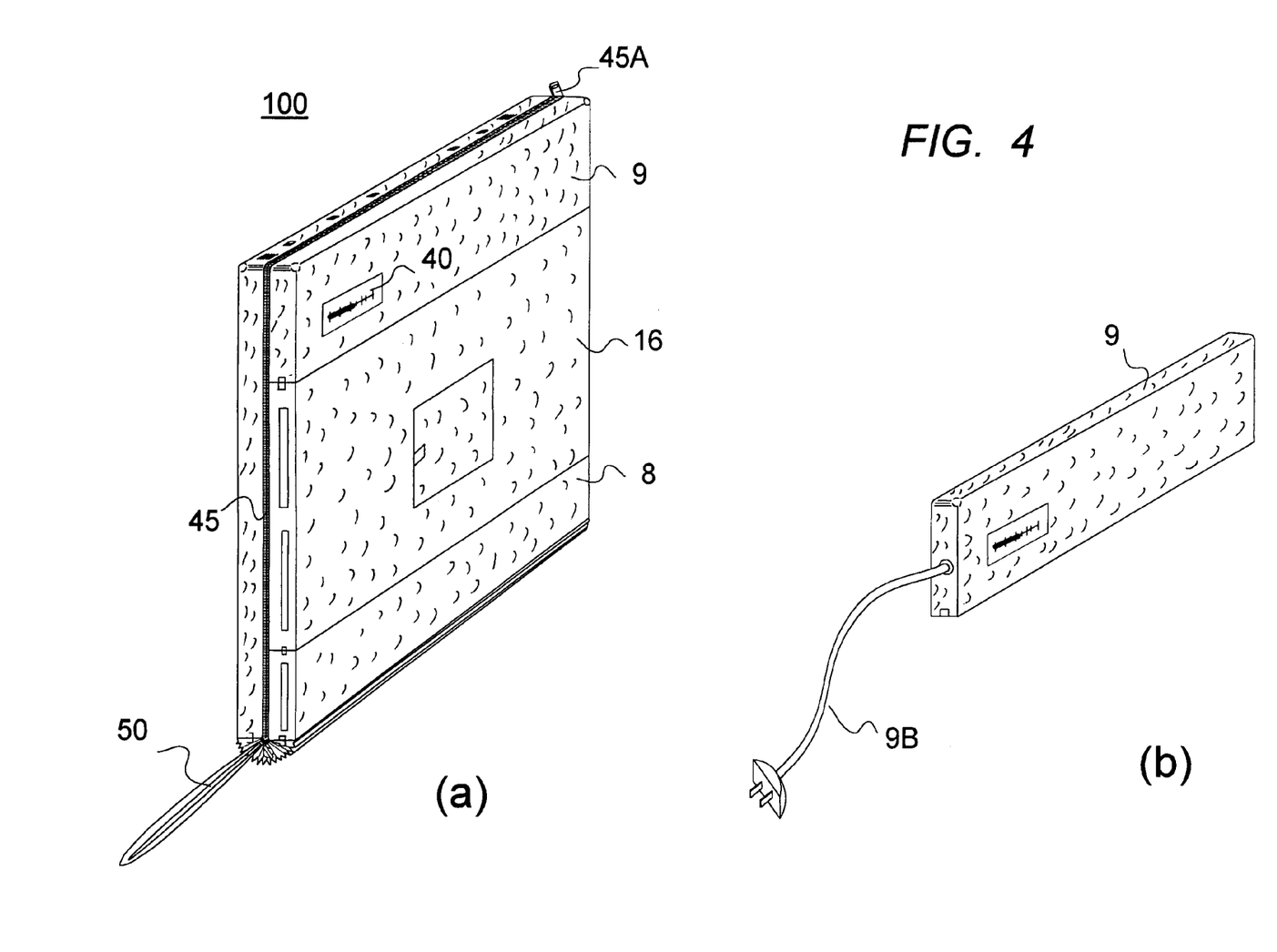
FIG. 4(a) shows a notebook or portable computer with a protective covering material.
FIG. 4(b) shows an electrical power source unit.

FIG. 4(a) shows the portable computer system or computer-display unit 100 covered with a thin soft protective material or film, such as leather or vinyl. This material will protect the unit when it is bumped and/or banged into hard objects while in the use in field or office environments. The protective material may have a texture or roughen surface (as indicated in the figure), which would also provide for a relatively high mechanical friction; so it will be easier to carry under one's arm. Holes or cutouts may be embodied in the protective cover for viewing and/or using the various indicators, switches and keypads. A zipper securing means 45 may be embodied with the notebook, as shown in FIG. 4(a). The zipper means may be attached to the leather or vinyl covers so that the unit can be zipped closed to secure and protect objects placed inside the notebook. A pull tab 45A of the zipper means is shown in the figure. This embodiment would be especially applicable in rugged or harsh environments. A strap 50 may be attached to the unit so that the user may temporarily store it on a hook for example. FIG. 4(b) shows an embodiment of the battery power source section 9. As in previous embodiments, it may be detached from the notebook computer-display unit. A spring loaded pull out power cord 9B may be embodied, so that the user can conveniently pull out the power cord to electrically charge the package. The power cord and plug may be easily retracted inside a cutout space on the side of the subassembly. Several adjunct attachments and/or accessories may be carried in small compartments in the notebook unit. In addition, accessories and attachments may be carried in a separate briefcase or like carrying case (not shown in the figures). Such accessories may include a line power supply and cord, extra battery power source section 9, spare earsets 34, spare handsets 14, external hard drive, external CD ROM drive, external mouse, spare styluses and/or spare video camera/lenes 46.

An important advantage of this notebook computer unit invention is that it can be operational when it is in the closed configuration. Thus, while carrying the unit in one's hand or under one's arm, the user can perform voice, data and/or video communications. The notebook unit can be used in an open configuration on a desktop, airline tray or wide variety of other computing environments. The unit can be configured for wire based or wireless communication operations. The unit can be used for general purpose computing, network computing, pen input computing, PCS/Cellular, data/video conferencing, on-line network computing and data collaboration applications. The notebook unit can be used as a personal organizer or personal information manager, such as a computer equivalent of the Franklin Planner™ or equivalent planners. A multiplicity of personal computing applications may be embodied on its computer. The unit may be capable of wire or wireless communications, linking it to multiple handsets and earsets. The notebook computer unit may have a plurality of electrical connectors along the edges or other convenient locations for connection to a plurality of external devices, including but not limited to: modems, network interface cards, hard disks, floppy disks, and bus extender enclosures.

Preferably the notebook assemblies should be made relatively thin and light weight that would be an advantage in mobile use. For example, the flat panel display assembly 2 should have a thickness of roughly 0.75 inch or less. The cover assembly may be comprised of the battery power source section 9, keyboard assembly 16, and external communications section 8 should have a thickness roughly 0.75 inch or less; so that the folded total thickness of the unit could be 1.5 inches or less. However, an overall thickness of one inch (i.e. 0.5 inch for each half), or less, may be preferred. A keyboard unit located in keyboard section 16 that may be Model KFNR available from Alps Electric Co. Ltd. This keyboard unit has a thickness of 10 mm, a 3 mm key travel, a 1 mm over travel and a minimum key pitch of 18 mm. Alps Electric also has introduced a 7.5 mm height keyboard assembly a full size keyboard, capable of high speed typing without operator tiring.

Figure 5:
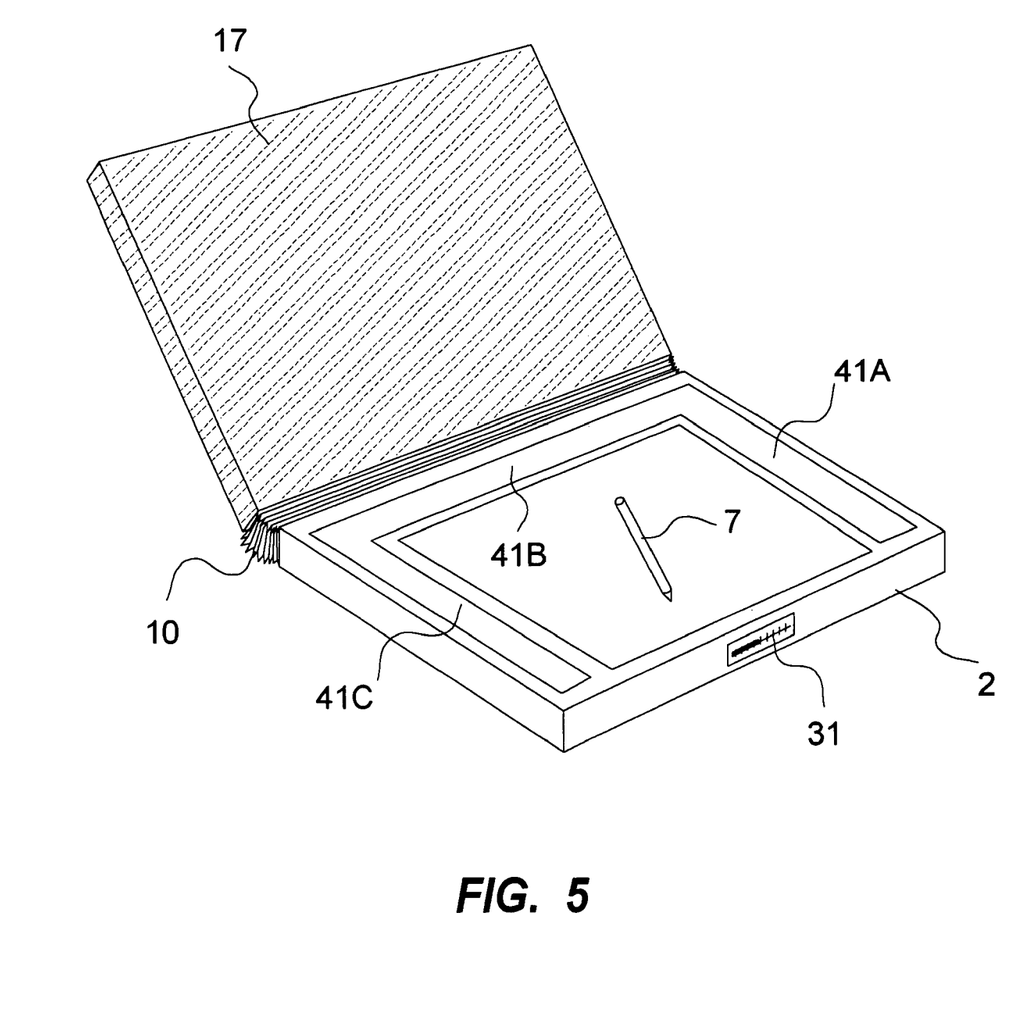
FIG. 5 shows a PDA like unit with a roughly transparent cover half.

FIG. 5 shows another alternate computer notebook embodiment, consisting of a somewhat smaller size flat panel assembly 2, display screen 4, pen/stylus means 7 and a roughly transparent display panel cover 17. The flat display panel could be an LCD, FED, or other type of flat panel display. The panel cover 17 could be made of a hard rigid material or a durable soft polymer material that is roughly transparent to a range of electromagnetic radiation frequencies. This cover may be made optically transparent to let the ambient room light to impinge onto a plurality of photoelectric light sensors 41A, 41B and 41C, which may be placed onto the display panel assembly 2. The photovoltaic or photoelectric light sensors may convert ambient room light to electrical voltages. These sensors may provide power energy to power the unit. The sensors may also help change the unit's battery source. Thus, with the roughly transparent cover 4 closed over the display panel assembly, some light rays will be transmitted through the cover. Photons from the ambient light are converted to an electric voltage, via the sensors and energy conversion circuitry that is applied to the computer unit's power source. Even if the computer unit is turned off and cover closed, the sensor could still be charging its batteries. The roughly transparent cover 17 may be made flexible layers of polyester, polycarbinate or other suitable materials. An advantage of this embodiment is an improvement in maintaining power to the notebook unit for longer periods compared to prior art battery powered units. Information on the display screen may be viewable even with the cover 17 is closed over the flat panel display assembly 2. Viewing of the display screen with the cover closed is an improvement over the opaque covers of conventional notebook computer and PDAs.

Figure 6A:
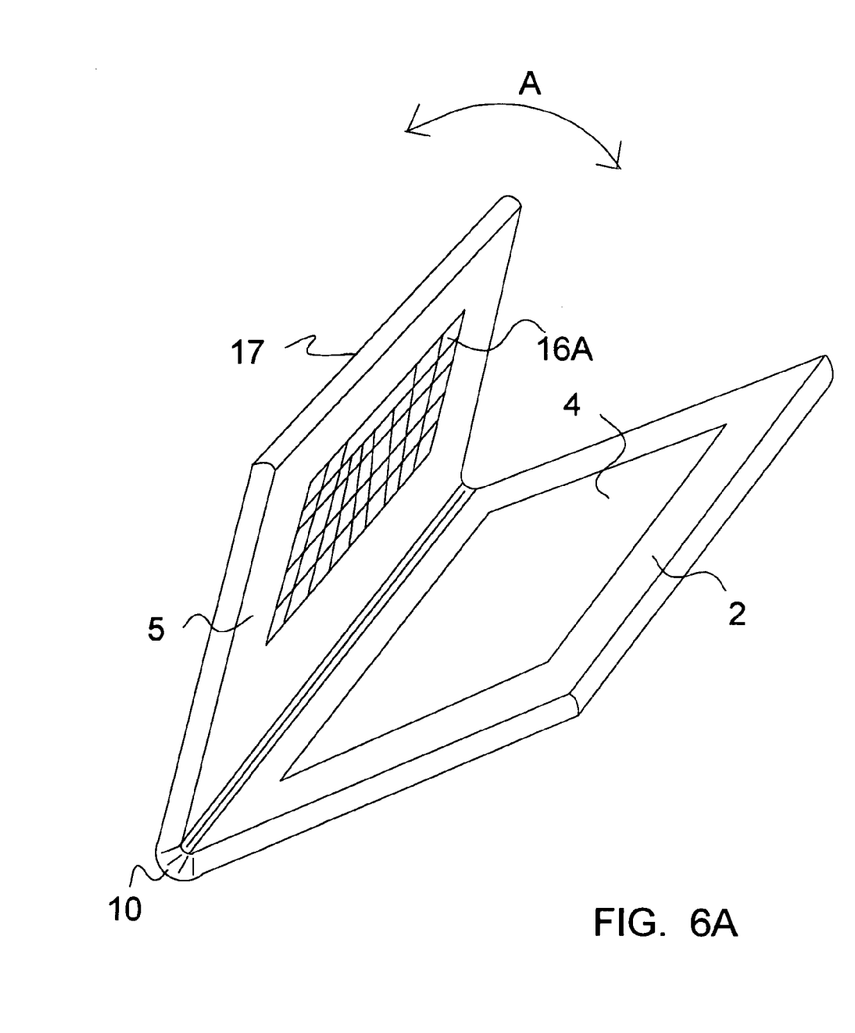
FIG. 6(a) shows a notebook or PDA in a partial open state.
Figure 6B:
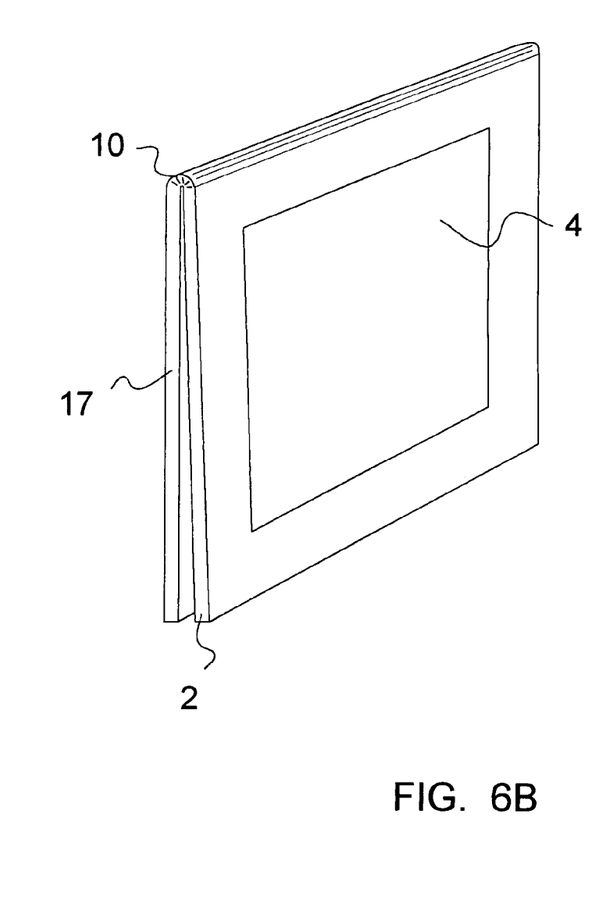
FIG. 6(b) shows the notebook or PDA in a reversed open state.

FIG. 6(a) shows another embodiment of a thin light weight notebook computer or PDA unit. The cover panel 17 contain a keyboard 16A, which may be a membrane type keyboard. The flat panel display assembly 2, with its display screen 4, is attached to the cover panel 17 by an expandable hinge means 10. The hinge means, which may be elastic or pliable, should be capable of being rotated over angles A. The hinge means should be capable of rotating through roughly 360 degrees, so that the two halves may be folded back onto each other as shown in FIG. 6(*b*). In the configuration of FIG. 6(*b*), the notebook unit can be held in one's arm, and the display screen can be written onto by a stylus or pen. The unit could also be placed onto the table or desk for convenient viewing. The cover keyboard assembly 17 can be closed to a hold loose sheets of paper, brochures, etc. It this latter case, the size of the panel halves should be slightly larger than 8.5" by 11" to facilitate one carrying loose sheets. Expandable hinge means 10 is designed to expand to accommodate a relatively thick stack of documents. Hinges may be made of pressed pliable corrugated plastic sheets can accommodate 0.5 inch or more gaps.

Various battery power sources 9 may be used in the above embodiments, including smart-battery technology having rechargeable batteries. They may be made capable of monitoring themselves for electrical charge level. Batteries that are suitable for this smart battery technology include nickel-metal hydride (NiMH) and lithium-ion (Li-ion) types. NiMH batteries are more sensitive to overcharge than NiCd batteries. Care must be taken to avoid overcharging that causes heating, which is damaging to the NiMH cycle life and capacity. Li-ion batteries require tight battery management for safety purposes. NiMH batteries are available from Sanyo Energy USA. Several power management and smart-battery devices are available. Duracell has a smart rechargeable battery with intelligent power management circuits for charge level gauge means, as disclosed above. The gauge may constantly show the state of the total battery charge. Advantages of an intelligent battery management system include customer notification of charge state, longer mobile operation times, longer battery lifetimes, and faster charge times. The rechargeable battery and power management circuit may collect and communicate the present and predicted battery data to the host notebook computer under software control.

Wireless communications adapters or modems disclosed in the above embodiments may consist of analog or digital transmitter and receivers, having control circuitry for cellular AMPS, PCS, CDPD, and RF links to wide area communication networks. The communication means disclosed herein may make use of long distance or short distance communications techniques, methods and equipment. Communication techniques may include several types of digital multiplexing and command access schemes such as TDMA, CDMA, GSM, or a combination thereof.

Figure 7:
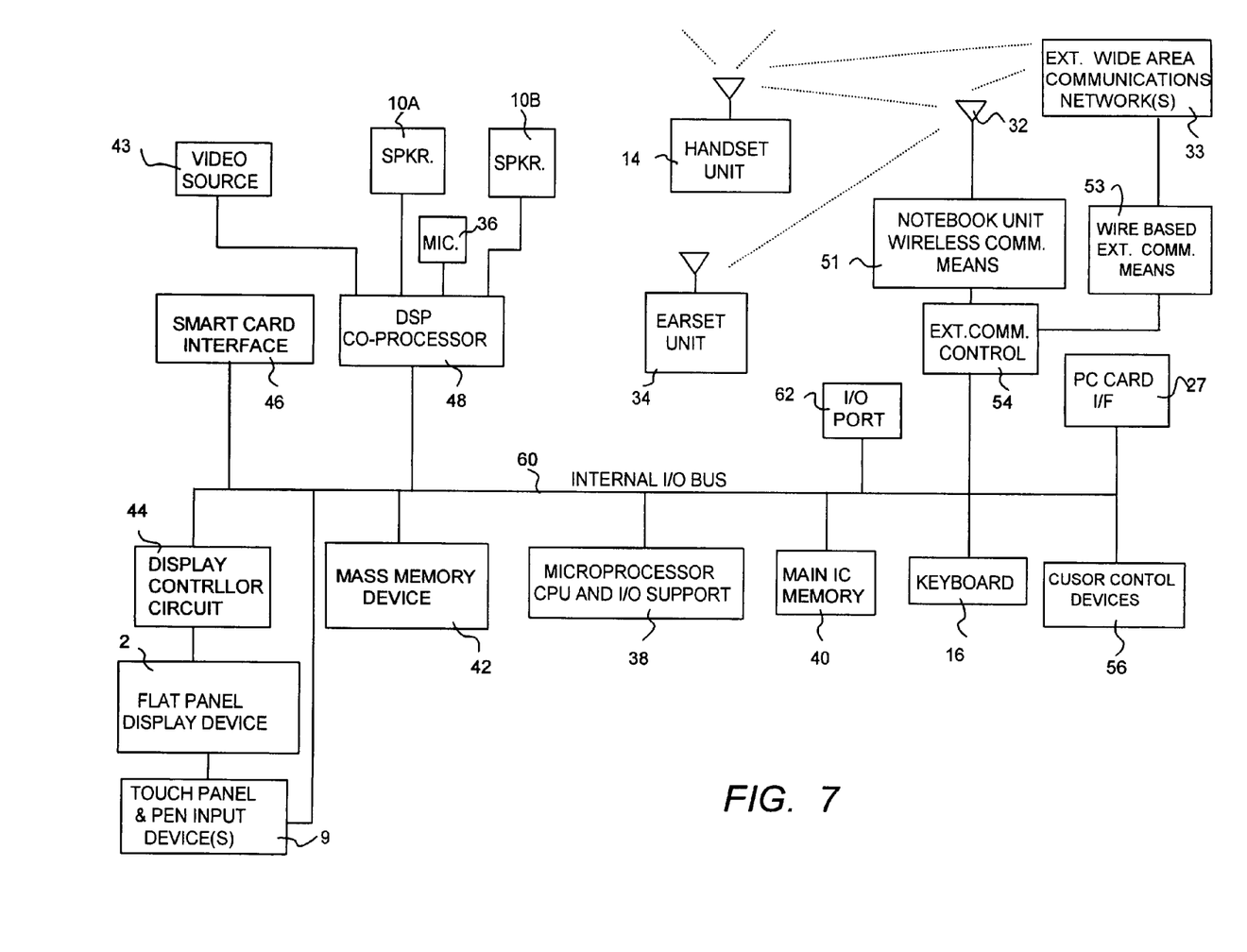
FIG. 7 shows block diagram of the computer system and associated elements.

FIG. 7 shows a block diagram of the system elements and associated circuitry, hardware, firmware and software. A microprocessor 38 controls most of the system elements. A computer system I/O bus 60 is shown interfacing several system elements. Many types of microprocessors may be embodied, including 16, 32 or 64 bit processors. The microprocessor may a complex instruction set computer (CISC) or a reduced instruction computer (RISC) computer types, or a combination of the two. CISC microprocessors that may be embodied, including the Pentium P5 manufactured by the Intel Corporation, the 68000 series microprocessors made by Motorola Corporation. Many types of RISC processors may be embodied, including the ARM series, the UltraSpac by Sun Micro Systems, the SH Series by Hitachi, PowerPC by Motorola and IBM and the MIPS R4000 series by several sources. The above manufactures' references and manuals are hereby incorporated by reference. Since electrical power dissipation is very important in portable systems, RISC microprocessor may have an advantage with smaller transistor counts, low voltages and fully static designs. RISC processors are available at an operating voltage of only 2.0 volts. RISC processors using 0.5 micron CMOS processes have resulted in die sizes for core functions of roughly 4 mm$^2$.

RISC processors can deliver 300-400 Mips/W. Microprocessor 38 may support several types of I/O buses (typically 32 bit wide), such as VL or PCI type buses. Microprocessor and I/O busses are well known to those skilled in the art.

A Microsoft Corporation's Windows™ operating system software may be embodied in the computer system. For these systems, the microprocessor CPU should be at 32 or 64 bit processors, capable of clock speeds in the 100 MHz or more. The microcomputer system may also consist of one or more I/O port means 62. A PC Card interface 27 may be embodied for bus expansion, extended memory or other added circuitry having access to the main bus 60. A mass memory device 42 may be embodied in the system, which typically is a magnetic disk memory hard drive. Many devices may be connected to the computer system, including a smart card interface 46 and keyboard 16. A touch panel and pen input means 7 may be embodied in the system, which may be separate or integrated. Examples of such touch pen devices are available from Elo Touch Systems Inc. in Oak Ridge, Tn., MicroTouch Systems Inc. in Methuen, Mass., and Carroll Touch Corp. in Round Rock, Tex. Pen and touch panel combinations means are available from Scriptel Corp. in Columbus, Ohio for the tablet, and Symbious Logic in Colorado Springs for an IC controller. Other pen and touch devices are available from Phillips Semiconductor, Sunnyvale Calif. Other more traditional cursor control devices 56 may be embodied, such as a mouse, trackball, touch pad, or force transducer. Preferably, most of these components should be sufficiently small as to fit into relatively thin display assembly 2.

The flat display panel device 2 is be interfaced to the system bus 60 through display controller circuitry 44. Preferably, the display controller should be capable of VGA or SVGA display formats. Integrated into the display controller may be a BitBlt engine (to accelerate graphics), RAMDAC memory, clock synthesizer and display frame buffer. A digital signal processing (DSP) coprocessor 48 may be embodied. The DSP may accept data from many sources including a microphone 36 and video data source 43. The DSP or microprocessor may output signals to one or more audio speakers, as shown as 10A and 10B. Video data may be in either analog or digital form. Microphone 36, and speaker(s) may be embodied in the handset or earset of the previous figures. Video data may be preprocessed by a the DSP. Video sources may include output from video cameras, VCR, broadcast TV, satellite TV or cable TV.

External communication means 54 may be connected to the bus, which may be capable of fast two way data transfers. The communications means 54 should be capable of controlling communications to and from a plurality of wire and wireless communication systems. These include wire based telephone means 53 and wireless communication means 51. The system may include an antenna means 32 for transmitting and receiving electromagnetic radiated signals. External communication means may be connected to one or more information or communication service providers. These service providers may include telephone services (RBOCs, LEC), on-line computer networks, Internet service providers, cable MSOs and/or long distance telephone firms. They also may include cable TV companies, satellite TV service, and LAN/WAN communication network providers. The external I/O port means 62 may be connected to a Universal Series Bus (USB) and/or an IEEE 1394 (Firewire®) type I/O bus.

Figure 8A:
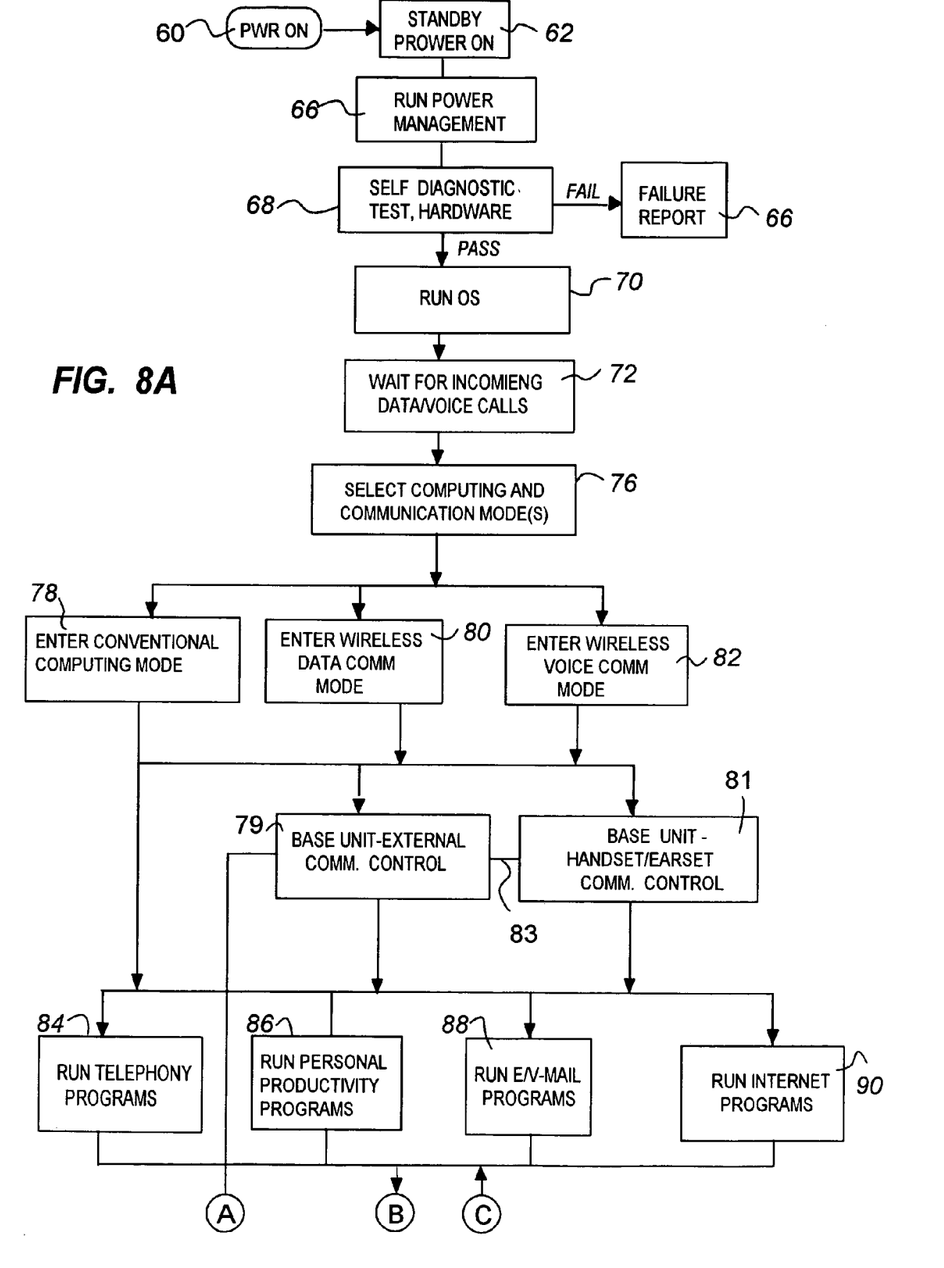
FIGS. 8(a) and 8(b) shows a flow diagram of the computer system programs and operations.
Figure 8B:
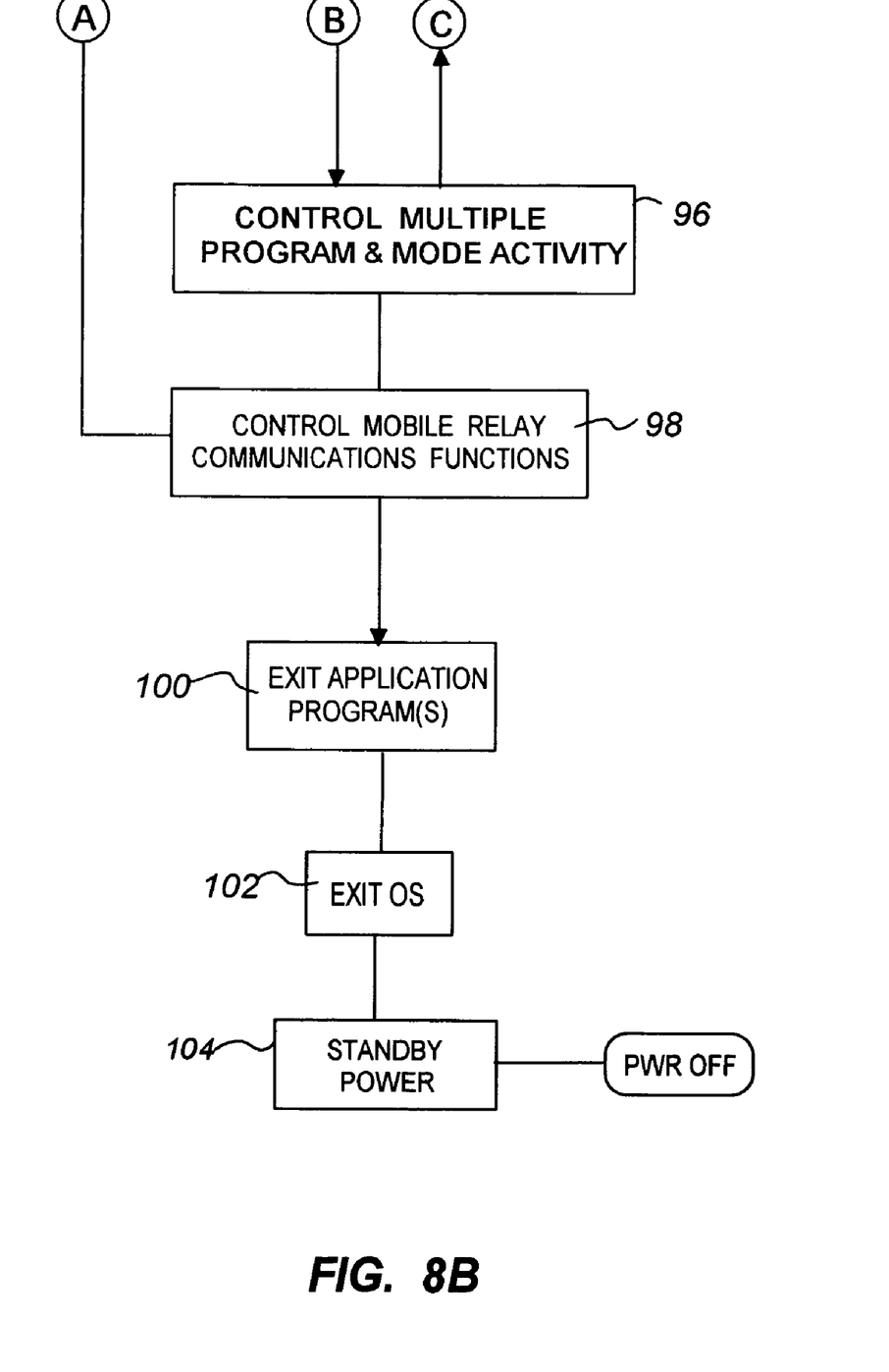

FIGS. 8(*a*) and 8(*b*) presents a typical flow diagram of computer programs executing in the system of the embodiments disclosed herein. After a power-on action 60, the system may enter a standby power on mode 62. A power management program 66 may then be execute followed by a self diagnostic routine 68 that tests the major hardware and firmware elements of the system. If the test fails, a failure report 66 may be generated and either displayed or stored. If the test passes, the operating system (OS) 70 may be loaded and executed. With the OS loaded successfully, the system waits for incoming data and/or voice calls 72. The system may automatically enter a default system mode, or the user can select one or mode computer or communication modes 76. The user has the option of selecting several operating modes, which may include a conventional computing mode 78, a wireless data communications mode 80, and a wireless voice communications mode 82. A conventional computing mode includes typical PC computing or PDA computing. While in any of the above modes, base unit to external communications operations 79 may be controlled, which includes data/voice wire and wireless options. Control code 81 may control the bi-directional handset or earset to base unit communications operations. These operations may execute roughly simultaneously or on a time shared bases, as indicated by connection 83. Under program control, either the wireless handset or the earset may communicate data first between the base unit, then the base unit may relay the data to/from the external communications network. The above communications may involve two way or bidirectional communications, including many types of data (including text, voice, graphics, video and/or images).

Many types of computer application programs may be executed by the computer system. For example, one or more telephony programs 84, office/personal productivity programs 86, electronic mail or voice mail 88, and Internet/Web browsing programs 90 may be used. Other PDA, PC or workstation programs may also be executed. One or more programs (algorithms or routines) 96 may be used to control this multiple program or system modes; this may include program coordination, scheduling and execution. Programs to control the mobile communications relay functions 98 may be embodied. Users may have the option to exit the application programs 100. Typically, after the applications have been closed, the user may exit the operating system 102. After the system exits the OS, the system may still may be in a standby power mode 104, in which the system can answer and process incoming calls, plus service other requests for other processing tasks. Users may have the option of turning off (or removing) all power to the unit 106.

It should be further understood that, although a preferred embodiment of the invention has been illustrated and described herein. Changes and modifications can be made in the described arrangements without departing from the scope of the appended claims. Other embodiments, additions, and improvements will be obvious to those with an ordinary skill in the relevant art.

I claim:

1. A notebook computer comprising:
   a) a base housing structure enclosing a keyboard, microprocessor and other electronics, whereby the base housing structure forms a first leaf of the notebook computer;
   b) a display panel assembly comprising a flat panel display and other electronics, whereby the display panel assembly forms a second leaf structure of the notebook computer, and wherein first and second leafs are physically connected by a hinge;
   c) a battery source section comprising a battery and electrical connection, wherein the battery source section is relatively rigid and thin comparable to the display panel leaf, and securely connected to the base housing structure wherein the secure connection prevents the battery source section from being rotated about any axis, and wherein the battery source section is adapted to form a substantial part of the exterior enclosing structure of the notebook computer; and
   d) said battery source section and base housing structure is adapted to relatively quick physical and electronic connection attach and release function actuated by a user via a finger push button or tab component, wherein the battery source section is securely latched to the notebook computer.

2. A notebook computer as recited in claim 1, wherein the finger push button or tab component is located on the battery source section.

3. A notebook computer as recited in claim 1, wherein the finger push button or tab component is located on the base housing structure.

4. A notebook computer as recited in claim 1, wherein the finger push button or tab is located on the battery source section, located near the opposite ends of the battery source section.

5. A notebook computer as recited in claim 1, wherein two finger push buttons or tabs are located on the base housing structure.

6. A notebook computer as recited in claim 1, wherein the battery source section is adapted to a relatively large long and narrow shaped structure, wherein the length of the section almost extends to the width of the notebook base housing structure.

7. A notebook computer as recited in claim 1, wherein the battery source section is adapted to be a re-chargeable battery unit.

8. A computer display tablet unit comprising:
   a) a base housing structure enclosing a display panel, microprocessor and other support electronics;
   b) a battery source section comprising a battery and electrical connections, wherein the battery source section is relatively rigid and thin, and securely connected to the base housing structure wherein the secure connection prevents the battery source section from being rotated about any axis, and adapted to form a substantial part of the exterior enclosing structure of the display tablet unit; and
   c) said battery source section and base housing structure is adapted to quick physical and electronic connection latching and un-latching via a finger push button or tab component.

* * * * *